United States Patent [19]

Willis, Jr. et al.

[11] Patent Number: 5,338,046
[45] Date of Patent: Aug. 16, 1994

[54] COMPOSITE POWDERED METAL RETAINING RING

[75] Inventors: Harry G. Willis, Jr., Coal City; Mark M. Shuster, Lisle, both of Ill.

[73] Assignee: Dana Corporation, Toledo, Ohio

[21] Appl. No.: 992,678

[22] Filed: Dec. 18, 1992

[51] Int. Cl.$^5$ .............................................. F16J 15/06
[52] U.S. Cl. ................... 277/180; 277/235 B; 277/DIG. 6
[58] Field of Search ............... 277/180, 233, 235 B, 277/236, DIG. 6, 234

[56] References Cited

U.S. PATENT DOCUMENTS

| | | | |
|---|---|---|---|
| 2,129,844 | 9/1938 | Kiefer | 277/236 X |
| 2,156,662 | 5/1939 | Wills | 277/235 B X |
| 2,299,813 | 10/1942 | Franks . | |
| 3,519,278 | 7/1970 | Fuhrmann et al. | 277/235 B |
| 3,531,133 | 9/1970 | Sheesley et al. | 277/180 |
| 3,561,793 | 2/1971 | Rode | 277/180 X |
| 3,618,960 | 6/1972 | Koehler | 277/236 X |
| 3,722,898 | 3/1973 | von Benningsen | 277/236 X |
| 3,820,799 | 6/1974 | Abbes et al. . | |
| 3,917,294 | 11/1975 | Abbes et al. . | |
| 4,114,907 | 9/1978 | Abbes et al. . | |
| 4,188,037 | 2/1980 | Abbes et al. . | |
| 4,369,980 | 1/1983 | Backlin . | |
| 4,518,168 | 5/1985 | Belter | 277/235 B |
| 4,795,174 | 1/1989 | Whitelow | 277/235 B X |
| 4,810,454 | 3/1989 | Belter . | |
| 4,860,567 | 8/1989 | Askey et al. . | |
| 5,033,426 | 7/1991 | Reichenbach et al. . | |
| 5,076,592 | 12/1991 | Pearlstein . | |
| 5,201,534 | 4/1993 | Miyaoh | 277/235 B |
| 5,203,849 | 4/1933 | Balsells | 277/164 X |

FOREIGN PATENT DOCUMENTS

| | | | |
|---|---|---|---|
| 42945 | 12/1975 | Japan | 277/235 B |
| 227853 | 9/1989 | Japan | 277/235 B |
| 1273407 | 5/1972 | United Kingdom | 277/235 B |

OTHER PUBLICATIONS

William F. Smith: "Structure and Properties of Engineering Alloys"; copyright 1981; pp. 411, 451–455.
EnerSeal Spring Energized Polymer Seals, Design Manual of The Advanced Products Company, Incorporated (no date avail.).
Helicoflex ® High Performance Sealing, Manual (no date avail.).

*Primary Examiner*—William A. Cuchlinski, Jr.
*Assistant Examiner*—Scott W. Cummings
*Attorney, Agent, or Firm*—Dykema Gossett

[57] ABSTRACT

A retaining ring for an engine gasket has an annular section with convex upper and lower surfaces. The ring is formed from a homogeneous composite powdered metal with multiple density material zones. The composite powdered metal retaining ring has numerous advantages. It is possible to design and manufacture a ring having a desired yield strength in both the vertical and hoop directions, wherein the stiffness along a particular axis may be selectively variable as a function of seal loading. The multiple density zones may be provided by layers of material. In other aspects of the invention, the powdered metal may be primarily titanium with trace elements of the composite powdered metal providing lubrication to reduce the coefficient of friction of the composite metal at the ring's outer surface.

13 Claims, 1 Drawing Sheet

COMPOSITE POWDERED METAL RETAINING RING

BACKGROUND OF THE INVENTION

The present invention relates to a retaining ring having a layered composite powdered metal construction for use with a cylinder head gasket.

A cylinder head gasket bears a clamping load from a bolted connection of a cylinder head and an engine block and relies upon that load to provide a seal against the sealing elements of the gasket.

The gasket includes a combustion seal ring to prevent the leakage of combustion gases during engine operation. Several types of combustion seal rings are known. One type, known as a yieldable combustion seal ring, is essentially comprised of a wire having a generally circular cross-sectional area. A clamping force applied to such a ring is concentrated at the point of contact, deforming the ring's circumference to effectively seal out combustion gases. This type of seal ring, however, is subject to thermal crushing which results from plastic deformation which tends to occur under high temperature operation during the life of the ring.

Dual sealing systems are known. U.S. Pat. No. 4,188,037 to Abbes, et al. discloses the use of a spring seal in combination with an elastomeric ring. The seals are not utilized as a portion of a combustion seal for a cylinder head gasket. Further, U.S. Pat. No. 4,369,980 to Backlin, discloses a cylinder head gasket for an internal combustion engine having double metal wrapped hoops to provide a reinforced fire ring around the combustion chamber. This type of dual seal fire ring is still subject to leakage under certain circumstances.

SUMMARY OF THE INVENTION

An improved dual combustion sealing system for a cylinder head gasket of an engine includes an energized combustion seal and an annular retaining ring. The retaining ring includes a section having a convex top surface and a convex bottom surface so that an initial load applied to the ring is a point load. Faces formed at the radial extremities are perpendicular to a radial axis. In one embodiment, a face at the radially inner extremity includes a groove adapted to receive an outer periphery of a spring energized combustion seal. The use of the groove increases surface contact between the ring and the energized combustion seal which avoids point loading of the spring energized seal in the radial dimension.

The ring is formed from a homogeneous composite powdered metal which contains zones of varying densities after sintering. In one preferred form, the powdered metal is composed primarily of titanium.

BRIEF DESCRIPTION OF THE DRAWINGS

The features and inventive aspects of the present invention will become more apparent upon reading the following detailed description, claims, and drawings, of which the following is a brief description:

DESCRIPTION OF A DETAILED EMBODIMENT

Figure 1:
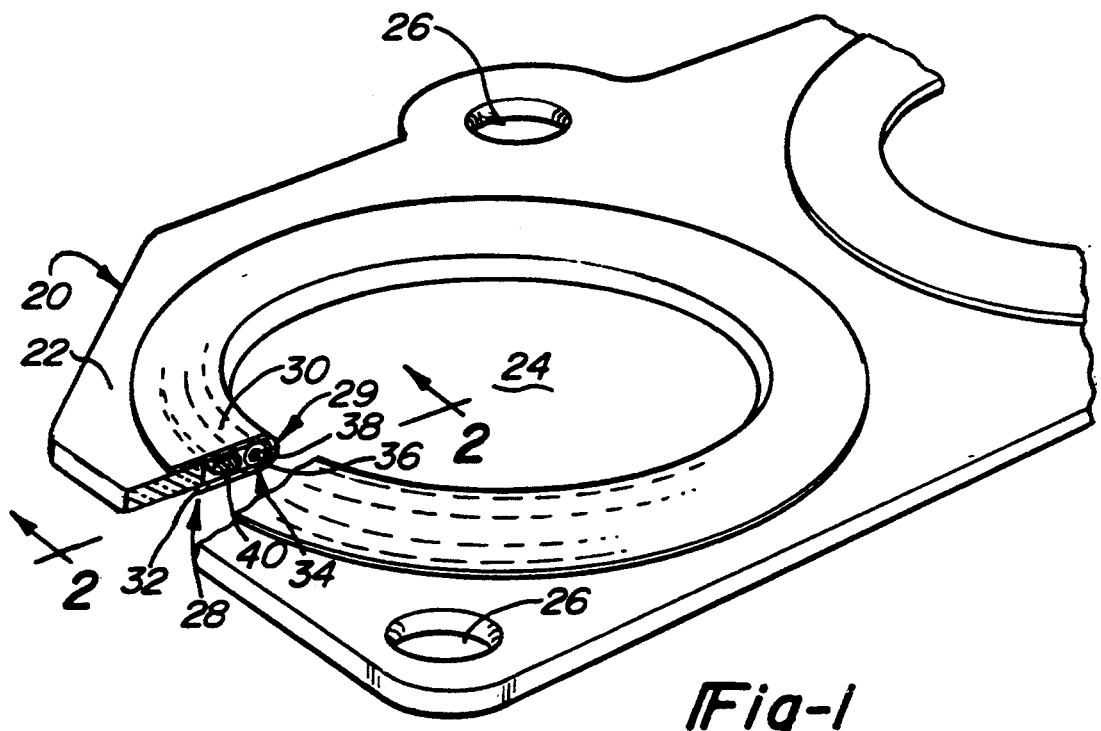
FIG. 1 is a perspective view of a portion of a gasket incorporating the present invention.
Figure 2:
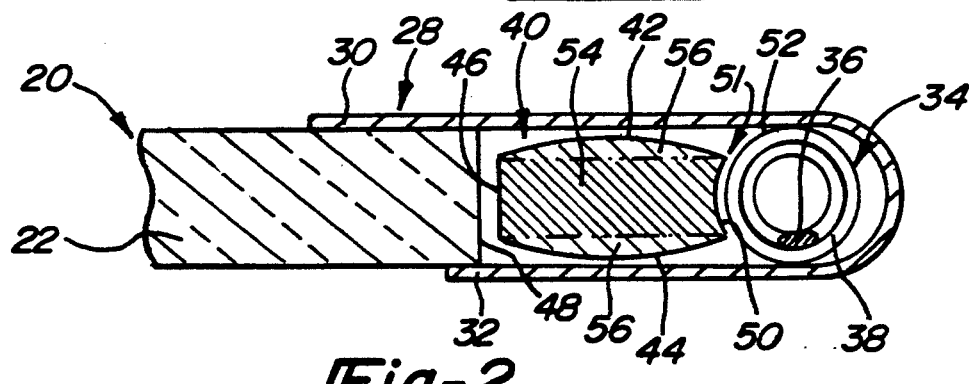
FIG. 2 is a cross-sectional view along lines 2—2 of the gasket of FIG. 1 which depicts a first embodiment of a first embodiment of a retaining ring constructed in accordance with the present invention.

A cylinder head gasket 20 illustrated in FIG. 1 includes a gasket body 22, cylinder apertures 24, and fluid flow openings 26. To provide a multiple sealing system 28 about a cylinder bore (not shown), gasket 20 includes an annular U-shaped flange 29 with an upper leg 30 and a lower leg 32. Referring also to FIG. 2, spring energized combustion seal 34 is disposed within the flange. Seal 34 comprises both an inner spring 36 and an outer spring, which is also referred to as a jacket 38, and acts as a primary seal against combustion gas leakage. A retaining ring 40, radially disposed between the spring energized combustion seal 34 and gasket body 22, acts as a positive mechanical stop for spring energized combustion seal 34. Ring 40 provides a secondary seal against combustion gas leakage.

As illustrated in FIG. 2, retaining ring 40 defines a radially elongate cross-section having a convex top surface 42 and a convex bottom surface 44 so that an initial axially applied compressive load applied to the ring is a point load, providing a superior combustion seal. A radially outer circumferential face 46 defines an extremity which is perpendicular to the radial direction, and corresponds to a mating surface 48 of gasket body 22. A circular concave groove 50 is formed on a face 51 which defines a radially inner extremity of ring 40 to correspond to and receive a mating outer convex peripheral surface 52 of spring energized combustion seal 34.

Retaining ring 40 provides stress support to spring energized combustion seal 34, maintaining it in position. Stresses applied to retaining ring 40 include both a radial stress and a hoop stress along a radial axis tangential to a circumference of the ring. The shape of groove 50 in conjunction with mating surface 52 distributes radial and hoop related loads over a maximum surface area, lowering the corresponding stresses. One preferred ratio between a radial width of ring 40 measured between faces 46 and 51 at the radial extremities and a thickness measured between convex surfaces 42 and 44 is approximately three to one. This ratio assures the necessary hoop strength to resist the internal pressure of the combustion forces.

Ring 40 is preferably formed from a composite powdered metal and includes a high strength material zone 54 sandwiched between two outer relatively soft material zones 56. Having soft material zones 56 at the outer vertical extremities of ring 40 improves the ring's deformability under initial loading conditions. Each of the zones extends radially across the ring from face 51 to face 46. This aspect of the ring design is particularly important with high strength material zone 54, which provides much of the needed hoop strength. To provide this strength, high strength material zone 54 is thicker than corresponding zones 56. High strength material zone 54 preferably has a porosity of approximately 0 percent and relatively soft material zones 56 have a porosity between 3 and 60 percent and preferably between 15 and 30 percent percent porosity. As a result, ring 40 is impermeable to combustion gases.

The inventive multiple density zones provide numerous advantages, including the ability to vary the design strengths of the ring in both the vertical and hoop directions. A material yield strength for retaining ring 40 along the vertical axis preferably has a range between 10 and 120 kpsi; more preferably between 25 and 43 kpsi. A most preferred value is approximately 25 kpsi. This strength value provides a good secondary combustion seal around the circumference of retaining ring 40. At the same time, however, it is preferable to have a yield strength along the hoop axis of between 100 and 200 kpsi, and more preferably between 100 and 160 kpsi. A most preferred value is approximately 160 kpsi to ensure that the retaining ring can withstand high internal cylinder pressures produced during engine operation, as well as the pressures exerted upon ring 40 by spring energized combustion seal 34.

Another advantage of using multiple density zones is that a variable spring rate may be more readily designed into the ring. Also, the stiffness along any selected axis may be varied as a function of retaining ring loading. Because of the convex top and bottom surfaces, initial assembly will result in point loading and local yielding of the retaining ring. This yielding will provide ring deformability to ensure a good initial seal around the circumference of the ring.

The variable spring rate may also be used to restrict further yielding. For example, as the vertical load is increased, ring 40 can be made to become stiffer, resisting thermal crushing while still providing a desirable combustion seal in a manner similar to that of a yieldable seal ring. The additional stiffness reduces the likelihood of plastic deformation, allowing the ring to recover its shape as a function of the Modulus of Elasticity.

Figure 3:
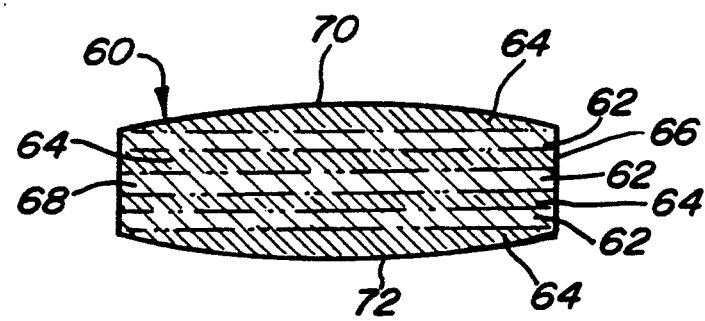
FIG. 3 is a cross-sectional view of a second embodiment of a retaining ring.

Referring now to FIG. 3, a second embodiment annular retaining ring 60 includes a multiple layer laminate with a plurality of high strength material zones 62 alternating with a plurality of relatively soft material zones 64. As in the first embodiment, it is preferred that zones 62 and 64 extend radially from a face 66 at a radially inner extremity to a face 68 at a radially outer extremity of seal 60. Again, a relatively soft material zone is located at each vertical extremity 70 and 72 to assure the ring's deformability under initial loading conditions. The shape of ring 60 is similar to that of ring 40. However, in the embodiment shown, face 66 does not include a groove.

Preferably, retaining rings 40 and 60 are formed from a powdered metal that primarily comprises titanium. More preferably, the powdered metal includes between 2 and 6 percent aluminum, 1 and 6 percent vanadium, 0.5 and 4 percent iron and between 1 and 6 percent molybdenum. The aluminum and vanadium add to the titanium's structural strength. The combination of iron and molybdenum increase the strength of the powdered metal at high temperatures while simultaneously reducing the coefficient of friction of the composite metal at the retaining ring's outer surface. Most of the iron and molybdenum react with the rest of the powder, but some is deposited as a residue providing a lubricant. The lower coefficient of friction resulting from the lubricant is beneficial in overcoming the abrasive nature of pure titanium. On the other hand, if too much iron is used, the resulting material may be too brittle, reducing the deformability of the retaining ring.

One method of manufacture includes placing the composite powdered metal in a graphite fixture which is then heated using known sintering techniques. The type of fixture used and the method of heating can be controlled, as known to those skilled in the art, to result in a separation of the homogeneous powdered metal into desired material zones. Typically, a homogeneous composite metal is placed in a fixture and heated at preselected temperatures and times.

Although the disclosed zones are preferably achieved from a homogeneous material, distinct materials may also be laminated together to achieve the hard and soft zones.

Preferred embodiments of the present invention have been described. It is to be understood that variations and modifications may be employed without departing from the scope of the present invention. Accordingly, the following claims should be studied to determine the true scope of the present invention.

We claim:

1. A cylinder head gasket comprising:
   an annular primary seal; and
   an annular secondary seal, said secondary seal positioned radially outwardly of and defining a radial axis, said secondary seal abutting said primary axis and including a radially elongate cross-section extending along said axis with two opposed outer convex surfaces each spaced away from said axis, said cross-section further comprising two annular faces centered on said axis, said faces defining radial extremities of said secondary seal, wherein said secondary seal is formed from a composite powdered metal having multiple density material zones of varying strength.

2. In a cylinder head gasket as recited in claim 1, wherein said powdered metal is primarily titanium.

3. In a cylinder head gasket as recited in claim 1, wherein said powdered metal also includes preselected amounts of aluminum, vanadium, iron, and molybdenum.

4. In a cylinder head gasket as recited in claim 1, wherein a ratio of said secondary seal between a radial width measured between said faces at said radial extremities and a thickness measured between said convex surfaces is approximately three to one to assure the necessary hoop strength to resist the internal pressure of the combustion forces.

5. In a cylinder head gasket as recited in claim 4, wherein said face at an inner radial extremity includes a groove.

6. In a cylinder head gasket as recited in claim 5, wherein said groove corresponds to a mating outer peripheral surface of said primary seal.

7. In a cylinder head gasket including a multiple sealing system, said gasket comprising an annular primary seal and an annular secondary seal, said secondary seal positioned radially outwardly of and defining a radial axis, said secondary seal abutting said primary seal, said secondary seal comprising:
   a radially elongate cross-section extending along said axis with two opposed outer convex surfaces each spaced away from said axis, said cross-section further comprising two annular faces centered on said axis, said faces defining radial extremities of secondary seal, wherein said secondary seal is formed from a composite powdered metal having multiple density material zones, said multiple density material zones including a high strength material zone having a porosity of approximately 0.0 percent and a relatively soft material zone having a porosity between 3 and 60 percent.

8. In a cylinder head gasket as recited in claim 7, wherein said secondary seal has a yield point between 100 and 200 kpsi along a hoop axis tangential to a circumference of said secondary seal, and a compressive yield point between 10 and 120 kpsi along an axis perpendicular to a radial axis and said hoop axis.

9. In a cylinder head gasket as recited in claim 7, wherein said multiple density zones comprise a multiple layer laminate.

10. In a cylinder head gasket as recited in claim 9, wherein said laminate layers extend radially between said faces.

11. In a cylinder head gasket as recited in claim 9, wherein the outermost of said layers of said secondary seal are of said relatively soft material.

12. An annular retaining ring acting as a secondary seal of a multiple sealing system and comprising:
- a radially elongate cross-section having alternate layers of relatively high strength material and relatively soft material extending from a radially inner face to a radially outer face, wherein the outermost of said layers are of said relatively soft material and said layers are formed from a homogeneous powdered metal.

13. A multiple sealing system for a cylinder head gasket, comprising:
- an annular primary seal, said primary seal including an inner spring and an outer spring; and
- an annular secondary seal positioned radially outwardly of and defining a radial axis, said secondary seal abutting said primary seal and including a radially elongate cross-section extending along said radial axis and having two opposed outer convex surfaces each spaced away from said axis, said cross-section further comprising two annular faces also centered on said axis, said faces defining radial extremities of said secondary seal, said secondary seal formed from a powdered metal alloy made up of titanium and an additional material to supply a lubricant to the finished secondary seal, wherein said powdered metal further includes iron and molybdenum to provide said lubricant, said powdered metal having 4 percent iron and between 1 and 6 percent molybdenum.

* * * * *

UNITED STATES PATENT AND TRADEMARK OFFICE
CERTIFICATE OF CORRECTION

PATENT NO. : 5,338,046
DATED : August 16, 1994
INVENTOR(S) : Harry G. Willis, Jr., et al It is certified that error appears in the above-indentified patent and that said Letters Patent is hereby corrected as shown below:

Column 4, line 19, "axis" (2nd occurrence) is changed to --seal--.

Signed and Sealed this

Tenth Day of January, 1995

Attest:

BRUCE LEHMAN

Attesting Officer          Commissioner of Patents and Trademarks